May 19, 1953        R. L. HULL        2,638,836

DAMPER FOR POULTRY HOUSE VENTILATORS

Filed Sept. 25, 1950

*INVENTOR.*
RICHARD L. HULL
BY
ATTORNEY

Patented May 19, 1953

2,638,836

UNITED STATES PATENT OFFICE 2,638,836

DAMPER FOR POULTRY HOUSE VENTILATORS

Richard L. Hull, Davenport, Iowa, assignor to American Machine and Metals, Inc., New York, N. Y., a corporation of Delaware Application September 25, 1950, Serial No. 186,607

4 Claims. (Cl. 98—119)

The invention relates to an improved damper that is readily removable for cleaning, and particularly adapted for use in connection with ventilators designed to change the air in a poultry house.

It is well known that the excreta of poultry is quite corrosive and the poultry house remains in a better condition with healthier poultry when the air is changed by an exhaust system. Since poultry houses are not heated, and the heat is radiated by the birds themselves, provision must be made for stopping the ventilating system in very cold weather. To prevent the outside winds from blowing back through the duct system past the stationary fan, causing illness of the flock, a damper must be provided.

The air in normal operation blowing past the damper causes it to become encrusted with filth which must be cleaned periodically.

The object of the invention is to provide an automatic damper which would be closed by gravity when the fan stops.

A further object of the invention is to provide a damper which will be seated by back draft.

A further object of the invention is to provide a damper which can be readily removed for cleaning.

Figure 1:
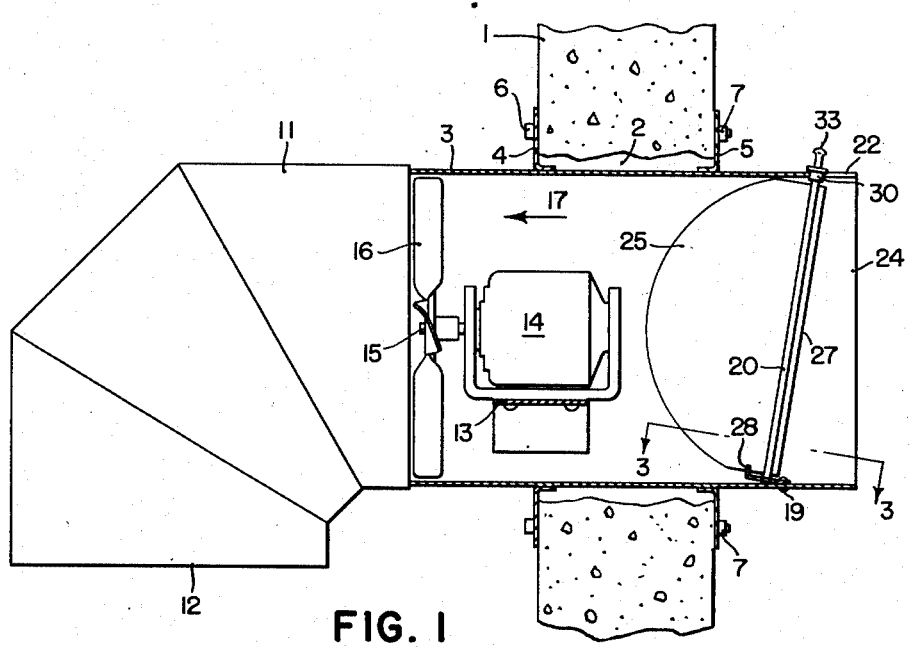
Fig. 1 shows in elevation, partly in section, a poultry house ventilator equipped with an improved damper.

1 indicates the wall of a poultry house which has been breached at 2. Welded to the cylindrical body 3 of the ventilator is a rectangular plate 4 having a central opening through which the cylindrical body expands. This plate rests against the outer side of the wall. The body 3 carries another rectangular plate 5 which has a central opening readily slidable along the cylindrical body. This plate is pushed up against the inner face of the wall. Bolts 6 extend through the wall. The plates 4 and 5 are held in place by the nuts 7 that are drawn up and thus support the cylindrical body. At its outer end the body 3 supports an elbow 11. This elbow discharges the air which is removed from the poultry house at 12. This elbow is to prevent rain or snow being blown into the poultry house when the fan is not in operation.

Figure 2:
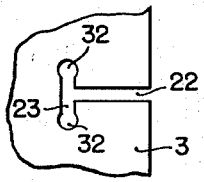
Fig. 2 is a fragmentary top view.

As shown in Fig. 1, the cylindrical body 3 carries a supporting bracket 13. Seated on this bracket is the horizontal electric motor 14 whose shaft 15 carries an axial flow fan 16 which moves the air in the direction of the arrow 17. At the lower side of the inlet of the cylindrical body a pivot plate 18 is anchored by a rivet 19. This pivot plate has two holes which serve to align the lower end of two pins 20 and 21 which support the damper section. The upper end of the cylindrical body is slotted in the manner shown in Fig. 2 with slot 22 wide enough for the pin 20 to pass. The cross slot 23, which is also wide enough for the pin to pass, is placed closer to the inlet end 24 of the cylindrical body than the holes in the plate 18 which align the lower end of the pins 20 and 21.

Figure 3:
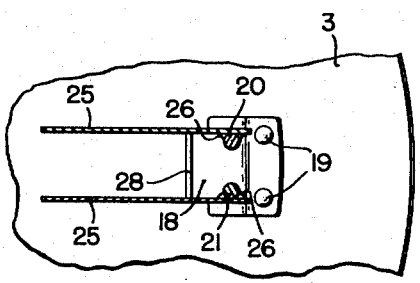
Fig. 3 is a section along the line 3—3 in Fig. 1.

A generally circular damper plate 25 is welded to each of the two pins 20, 21 at 26 in the manner shown in Fig. 3. The rear edge 27 of the plate projects beyond the pin 20 or 21 while the forward end of the plate 18 is turned upward at 28 so as to form a stop against which the plates rest when in their open position. Each of the pins 20 and 21 carries a loosely movable sleeve 30 which has a flange 31 at its upper end.

Each end of the cross slot 23 is enlarged as shown at 32 so that the body of the sleeve 30 may enter. The upper end of each of the pins 20, 21 is then burred as shown at 33 to prevent the sleeve from passing out over the end of the pin.

Figure 4:
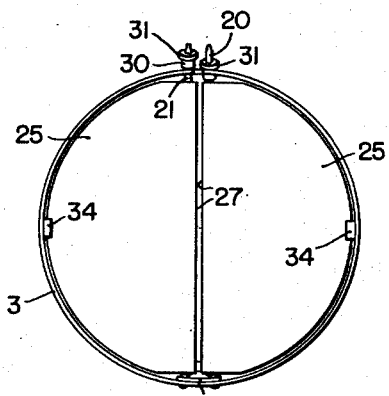
Fig. 4 is an end view with one of the dampers shown in position for removal.

It is obvious that when the sleeve 30 is dropped into the expanded portion 32 the pins 20, 21 will not be able to move through the cross passages 22 or 23 and the damper leaves will, because the pins are held in an inclined position, be swung by gravity to their closed position as shown in Fig. 4. In this position the edges 27 of the two plates are quite close to each other and the outer end of each damper plate will rest against a stop 34 carried by the cylindrical body 3.

In the operation of this apparatus when it is mounted in the wall of a poultry house, current is supplied to the motor 14 which turns the fan 16 to draw air in the direction of the arrow 17 out of the poultry house. The pressure of the air in the poultry house seeking to flow out through the cylindrical body 3 will lift the dampers into the position shown in Fig. 1 where they rest against the stop 28 of the piece 18.

As soon as the fan is shut down gravity causes the damper to close and assume the position shown in Fig. 4 which prevents winds from the outside blowing back through the cylindrical body.

Since there is a good deal of litter and moisture in the poultry house the fan will draw these into the cylindrical body, some will be deposited on the damper and the blade of the fan 17, as well as the body of the motor 14.

When it is necessary to clean this poultry house ventilator, the motor is stopped, the sleeve 30 is lifted, as shown on pin 20 at Fig. 4, and this allows the operator to push the upper end of the pin into the center and then out through the passage 22. The pin 20 can now be lifted out of its bearing in plate 18, and the entire damper removed and cleaned. In removing the damper, the entire end opening of the cylindrical body is unrestricted and the operator can readily reach in to clean the inside of the cylindrical body, the motor, and the fan carried by the motor.

I claim:

1. In combination, a horizontal circular ventilating duct, a plate having two bearings equally distant from the vertical central plane of the duct mounted on the lower segment of the duct, two circular openings in the upper segment of said duct similarly spaced as to the central plane but closer to the inlet of the duct than said lower bearings, removable sleeves mounted in said openings, two rods each extending across the duct from one lower bearing and through one of said sleeves, and an approximately semi-circular damper rigidly secured adjacent its straight edge to each rod, and stops on the duct against which the weight of the damper section is brought to rest by gravity acting on the damper when no air is flowing through the duct thus closing off the duct, a slot wider than the diameter of said rod and narrower than said sleeve extending from each circular opening to the end of said duct.

2. In a duct with a removable damper, in combination, a horizontal circular ventilating duct, a plate having two bearings equally distant from the vertical central plane of the duct mounted on the lower segment of the duct, two circular openings in the upper segment of said duct similarly spaced as to the central plane but closer to the inlet of the duct than said lower bearings, removable sleeves mounted in said openings, two rods each extending across the duct from one lower bearing and through one of said sleeves, and an approximately semi-circular damper rigidly secured adjacent its straight edge to each rod, stops on the duct against which the weight of the damper section causes it to rest when no air is flowing through the duct thus closing off the duct, a slot wider than the diameter of said rod and narrower than said sleeves extending from each circular opening to the end of said duct which permits lifting the rod out of its lower bearing and sliding it along said slot after the sleeve has been lifted out of its circular opening in the duct.

3. In a duct with a removable damper, in combination, a horizontal circular ventilating duct, a plate having two bearings equally distant from the vertical central plane of the duct mounted on the lower segment of the duct, two circular openings in the upper segment of said duct similarly spaced as to the central plane but closer to the inlet of the duct than said lower bearings, removable sleeves mounted in said openings, two rods each extending across the duct from one lower bearing and through one of said sleeves, and an approximately semi-circular damper rigidly secured adjacent its straight edge to each rod, stops on the duct against which the weight of the damper section causes it to rest when no air is flowing through the duct thus closing off the duct, an upturned portion of said plate against which said dampers bear when air is flowing through said ducts, a slot wider than the diameter of said rod and narrower than said sleeves extending from each circular opening to the end of said duct which permits lifting the rod out of its lower bearing and sliding it along said slot after the sleeve has been lifted out of its circular opening in the duct.

4. A duct with a removable damper adapted to be mounted in said duct some distance from the end comprising, a circular duct, a semi-circular damper section adapted to close half of said duct one of the ends of said damper being cut away at right angles to the diametral edge, a rod rigidly attached to this damper section near its diametral edge, a support for one end of the rod at one side of the duct, a circular hole on the opposite side of the duct so placed longitudinally that the rod will be tilted, a sleeve sliding on said rod and adapted to be supported in said hole, a slot wider than the diameter of the rod but narrower than the diameter of the sleeve extending from said hole to the end of the duct, a knob on the projecting end of said rod allowing the damper section to be elevated when it has been turned into the axial plane of the duct prior to removal.

RICHARD L. HULL.

References Cited in the file of this patent

UNITED STATES PATENTS

| Number | Name | Date |
|---|---|---|
| 254,884 | Pennycuick | Mar. 14, 1882 |
| 364,074 | Williams | May 31, 1887 |
| 1,792,585 | Hertel | Feb. 17, 1931 |
| 1,935,216 | Sievert | Nov. 14, 1933 |
| 2,541,665 | Prudhon | Feb. 13, 1951 |

FOREIGN PATENTS

| Number | Country | Date |
|---|---|---|
| 130,232 | Switzerland | Jan. 16, 1929 |